July 22, 1969 H. F. FROHBACH ET AL 3,457,363
VERTICAL RESOLUTION FACSIMILE SYSTEM
Filed Oct. 3, 1966
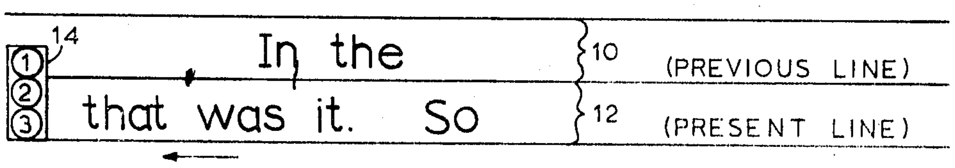
FIG. 1
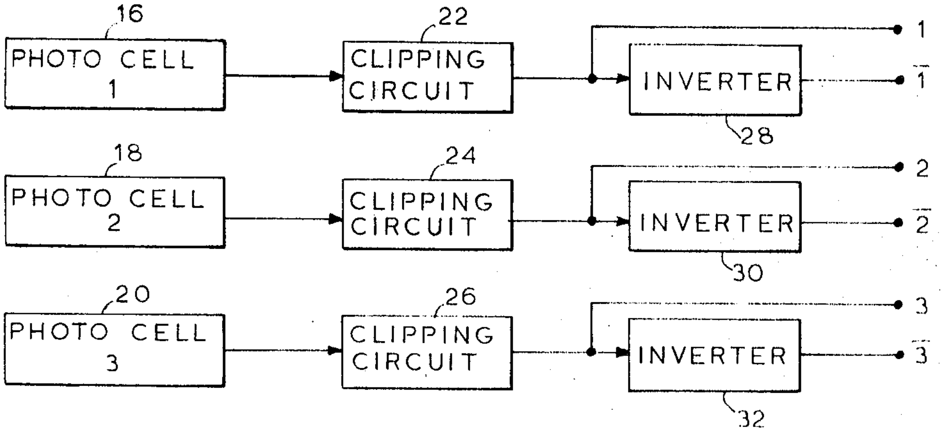
FIG. 2
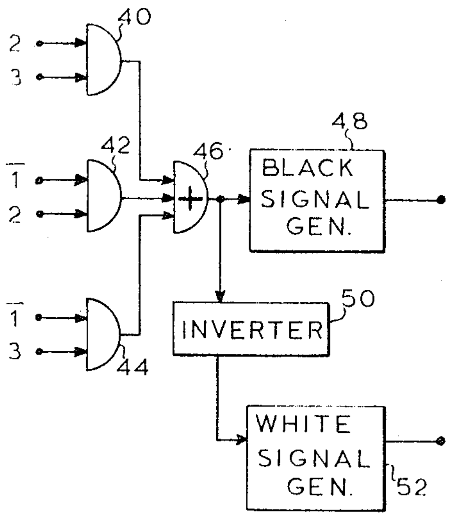
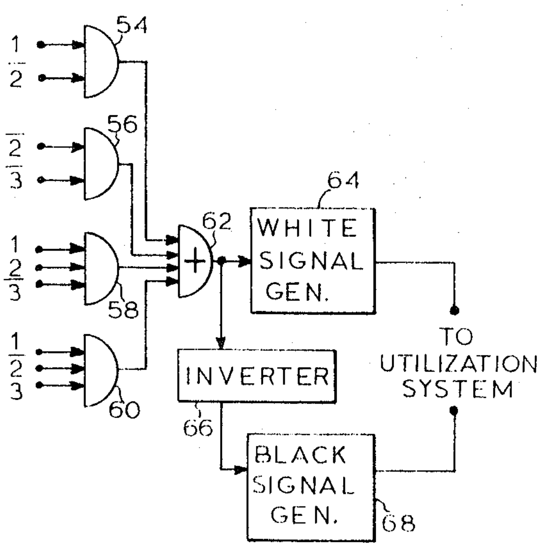
FIG. 3 FIG. 4
INVENTOR.
HUGH F. FROHBACH
ALBERT MACOVSKI
BY Samuel Lindenberg
Arthur Freilich
ATTORNEYS United States Patent Office 3,457,363

Patented July 22, 1969

3,457,363
VERTICAL RESOLUTION FACSIMILE SYSTEM

Hugh F. Frohbach, Sunnyvale, and Albert Macovski, Palo Alto, Calif., assignors to Southern Pacific Company, San Francisco, Calif., a corporation of Delaware

Filed Oct. 3, 1966, Ser. No. 583,513
Int. Cl. H04n *3/16, 7/00*
U.S. Cl. 178—6 5 Claims

ABSTRACT OF THE DISCLOSURE

Improved resolution facsimile scanning system comprising a linear array of photocells, each photocell of which looks at an area smaller than that of the scanning line, and a logic system to combine the signals from each photocell to block duplication of black signals in marginal black-white areas of the scanning lines.

This invention relates to facsimile systems and more particularly to apparatus for improving the resolution in scanning of line scanned facsimile systems.

In line scanned facsimile systems, there are two losses in resolution in the vertical direction due to two causes. One of these is a "Kell factor," or utilization factor as it is sometimes called, which relates to the probability that a given scan line will traverse a given small element. In the worst case, the element will occur between two scanning lines and will be reproduced in both lines at reduced amplitude. The loss of resolution due to this quantization process is a statistical consideration, and has been estimated as providing an average resolution of approximately 0.7 of the actual scan line density.

The second loss is due to the integration of information which is appreciably smaller than the width of a scan line. It occurs when a relatively large scanning aperture scans a thin line, resulting in a low output signal. Thus, thin lines are reproduced as being very light grey. In a clipped system, for document transmission, where signals exceeding a given threshold are called "black" and those not exceeding the threshold are called "white," this loss due to thin lines is a particularly bad problem, since the resulting signal may not exceed threshold.

An object of this invention is the provision of a system for eliminating "Kell" factor and integration information losses in a line scanned system.

Yet another object of this invention is the provision of a system for improving the resolution of a line scanned system.

Still another object of the present invention is the provision of a novel arrangement for scanning lines and combining the signals derived from the line scanning arrangement to improve the resolution of scanning.

These and other objects of this invention may be achieved by scanning the copy with a linear array of photocells, each looking at an area smaller than that of a scanning line so that the total region scanned by the array is greater than the size of a scanning line. This array provides information outside of the scanning line itself so that a dark element which occurs primarily in one scanning line, but only partially in an adjacent line can be assigned to the line in which it belongs and not in the adjacent line. In cases where dark elements occur, partially but equally in two adjacent lines, an arrangement is provided for favoring the printing of that dark element in only one scan line. Further, since each photocell sees an element which is significantly smaller than the size of the scan line, thin lines provide no problem since they are reproduced in the same manner as the thick lines are reproduced.

The novel features that are considered characteristic of this invention are set forth with particularity in the appended claims. The invention itself both as to its organization and method of operation, as well as additional objects and advantages thereof, will best be understood from the following description, when read in connection with the accompanying drawings, in which:

FIGURE 1 is illustrative of a scanning arrangement in accordance with this invention; and FIGURES 2 and 3 are block schematic diagrams of the logical circuitry which is employed in accordance with this invention to improve the vertical resolution of a line scanning circuit; and FIGURE 4 is a block schematic diagram of the logic circuitry required to generate a white representative signal in accordance with this invention.

In FIGURE 1 there is represented two lines respectively 10, 12 which are on a document which is to be scanned. In accordance with this invention, the scanning head will contain three photodiodes which look at the scanning copy through a mask 14 having three openings, respectively 1, 2, and 3, therein. Each one of the openings looks at one half of a line so that opening 1 looks at the bottom half of line 10 and openings 2 and 3 respectively look at the upper and lower halves of scanning line 12. Obviously, if each of three photodiodes look at only the region indicated by a corresponding mask opening no mask is necessary.

In FIGURE 2 the rectangles respectively labelled "photocell 1," "photocell 2" and "photocell 3," respectively 16, 18, 20, are representative of photo cells or photodiodes which receive illumination through the respective openings 1, 2, 3, in the mask 14. It will be assumed that the mask 14 is stationary and the copy moves horizontally past the mask. The line 12 is the present line being scanned for reproduction, and the line 10 was the line previously scanned for reproduction. The rules applied are that elements which appear in the bottom half of the previous line, or line 10, and in the top half of the present line, or line 12, are deemed to be white, since all uncertainties are being resolved by moving them to the "upward" element or element 1, since this situation caused black to be printed in the previous line. All black in the present line or an isolated thin black line in the present line are reproduced as black. Black areas in the previous line which have spilled over into the present line are reproduced as white, as are all white areas and thin white stripes in black areas which occur in the present line. A logic table for carrying out these rules is reproduced below.

"1" represents a black area viewed by the photocell and "0" represents a white area viewed by the photocell.

| | Photocells | | | | Photocells | | |
|---|---|---|---|---|---|---|---|
| | 1 | 2 | 3 | | 1 | 2 | 3 |
| Black.... | 1 | 1 | 1 | White...... | 0 | 0 | 0 |
| | 0 | 1 | 1 | | 1 | 0 | 0 |
| | 0 | 1 | 0 | | 1 | 1 | 0 |
| | 0 | 0 | 1 | | 1 | 0 | 1 |

The respective photodiodes 16, 18 and 20 are connected to clipping circuits respectively 22, 24, 26 which produce a binary signal output definitely indicative of a black or a white area having been looked at by the photodiode. Clipping circuits are well known circuits which produce an output when the input exceeds a predetermined level. Each clipping circuit output is applied to an inverter respectively 28, 30, 32. The direct output from the respective clipping circuits are designated by 1, 2, 3, to correspond to the apertures shown in mask 14. The respective inverter outputs bear the numerals $\bar{1}$, $\bar{2}$, $\bar{3}$, indicative of the fact that when no input signal is applied to the inverter an output is provided thereby. Inverter circuits are also well known in the art and produce an output when there is no input.

Referring now to FIGURE 3, there may be seen the logic circuit which in conjunction with the scanning arrangement eliminates "Kell" factor and the effects of integration of information smaller than the width of the scan line. For providing a black signal, in accordance with the logic set forth in the table, a first AND gate 40 receives signals from photocells 2 and 3, a second AND gate 42 receives the $\bar{1}$ signal designating no output from photocell 1 but a 2 signal designating that photocell 2 saw a black. A third AND gate 44 also receives the $\bar{1}$ signal and a 3 signal indicative of the fact that photocell 3 saw black. The outputs of the three AND gates are applied to an OR gate 46 which drives a black signal generator 48. The output of the black signal generator is applied to a utilization system which may be a transmitter in a facsimile system or some encoding system as desired. As shown by the table, the logical arrangement causes a black signal to be generated when in the present line black is detected by both photocells 2 and 3 together, or 2 or 3 and no black is detected in the previous line on the photocell 1.

Since the "white" table is completely complementary to the "black" table, if desired, white signals may be generated in the absence of black signals, by connecting an inverter circuit 50 to the output of the OR gate, so that in the absence of black signals from OR gate 46, white signals are produced by the inverter 50 which are applied to a white signal generator 52. The white signal generator is also applied to a utilization system.

FIGURE 4 shows the logic that may be used if it is desired to generate a white signal in accordance with the "white" table. An AND gate 54 provides an output in response to a black signal from photocell 16 and a white signal from photocell 2. Photocell 56 provides an output in response to white signals from photocells 2 and 3. AND gate 58 provides an output in response to black having been "seen" by photocells 1 and 2, and white having been seen by photocell 3. AND gate 60 provides an output in response to black signals from photocells 1 and 3, and a white signal from photocell 2.

OR gate 62 collects the outputs from AND gates 54, 56, 58, 60, and applies whichever one occurs to a white signal generator 64, to generate an appropriate white representative signal for transmission or whatever utilization is to be made of the signal.

If desired, it is possible to generate the required black representative signals from the logic circuit arrangement of FIGURE 4 in view of the reciprocity of the logic by connecting an inverter 66 and a black signal generator 68 to the output of OR gate 62. The number of AND gates and the number of inputs to the AND gates shown in FIGURE 4 may be reduced to the number of AND gates and inputs shown in FIGURE 3, if FIGURE 4 logic alone were used to provide the white and black representative signals. However, when the logic of FIGURE 3 and the logic of FIGURE 4 are to be used together to produce the respective black and white representative signals (omitting the inverters 50 and 66), then the number of AND gates and their inputs, shown in FIGURE 4, are required to avoid ambiguous responses to the photocell signals.

The system described can be used to provide effectively greater resolution for a given density of scanning lines. Alternatively, for a given effective resolution, the line density can be decreased, providing a system which compresses the time bandwidth product required to send a given document. This compression can be 30 to 50% with acceptable results.

There has accordingly been described and shown herein a novel and useful system for improving the vertical resolution of the reproduction of line scanned documents.

What is claimed is:

1. In a system for scanning data on a document in successive lines, by relatively moving the document past a scanning head the improvement comprising:

a plurality of photocell means, a second and third of which are positioned for scanning an upper and lower portion of one of said lines and a first of which is positioned for scanning the lower portion of a line adjacent said one of said lines, each said photocell means producing a first output signal when said photocell means views black and a second output signal when said photocell means views white; and logic means to which said first, second and third photocell means are connected, said logic means including first means for producing a black representative signal in the presence of first signals from said second and third photocell means, second means for producing a black representative signal in the presence of a first signal from said photocell means and a second signal from said second photocell means, and a third means for producing a black representative signal in the presence of a first signal from said third photocell means and a second signal from said first photocell means.

2. In a system as recited in claim 1 wherein said system includes inverter means connected to the output of said logic means for producing a white representative signal in the absence of a black representative signal being produced by said logic means.

3. In a system as recited in claim 1 wherein there is include another logic means to which said first, second and third photocell means are connected, said another logic means including fourth means for producing a white representative signal in response to a first signal from said first photocell means and a second signal from said second photocell means, fifth means for producing a white representative signal in response to a second signal from said second and third photocell means, sixth means for producing a white representative signal in response to a first signal from said first and second photocell means, and a first signal from said third photocell means, and seventh means for producing a white representative signal responsive to a first signal from said first and third photocell means, and a second signal from said second photocall means.

4. Apparatus for improving the resolution of a line scanning system of the type wherein data on copy is to be scanned a line at a time, the improvement comprising a first, second and third photocell, said first photocell being positioned for viewing the lower half of one line and said second and third photocell being aligned with said first photocell and respectively viewing the upper and lower halves of a line adjacent to said one line;

means for deriving from said respective photocells a first signal when the region of the copy opposite said photocell is black and a second signal when the region on the copy opposite the photocell is white;

first means for producing a white representative signal responsive to a first signal from said first photocell means and a second signal from said second photocell means, second means for producing a white representative signal responsive to a second signal from said second and third photocell means, third means for producing a white representative signal responsive to a first signal from said first and second photocell means and a third signal from said third photocell means, fourth means for producing a white representative signal responsive to a first signal from said first and third photocell means and a second signal from said second photocell means, and inverter means coupled to the outputs of said first, second, third and fourth means for producing a black representative signal in the absence of a white representative signal.

5. In a system for scanning data on a document in successive lines, by relatively moving the document past a scanning head the improvement comprising;

a plurality of photocell means, a second and third of which are positioned for scanning an upper and lower portion of one of said lines and a first of which is positioned for scanning the lower portion of a line adjacent said one of said lines, each said photocell means producing a first output signal when said photocell means views black and a second output signal when said photocell means views white; and first logic means for producing a black representative signal, said first logic means including three AND gates;

means for applying first signals from said second and third photocell means to said three AND gates;

means for applying to a second of said AND gates a first signal from said third photocell means, and a second signal from said first photocell means;

means for applying to a third of said AND gates a second signal from said second photocell means and a second signal from said first of said photocell means;

said second logic means including, a fourth, fifth, sixth and seventh AND gate;

means for applying to said fourth AND gate a second signal from said second and third photocell means;

means for applying to said fifth AND gate a first signal from a first and second of said photocell means, and a second signal from third to said photocell means;

means for applying to said sixth AND gate a first signal from said first and third photocell means and a second signal from said second photocell means; and means for applying to said seventh AND gate a first signal from said first photocell means and a second signal from said second photocell means.

References Cited

UNITED STATES PATENTS

| | | | |
|---|---|---|---|
| 3,371,160 | 2/1968 | Hurford | 178—7.1 |
| 3,414,677 | 12/1968 | Quinlan | 178—6 X |

RALPH D. BLAKESLEE, Primary Examiner

U.S. Cl. X.R.

178—7.1